(12) United States Patent
Horie et al.

(10) Patent No.: US 8,742,058 B2
(45) Date of Patent: Jun. 3, 2014

(54) BIAXIALLY ORIENTED POLYESTER FILM AND LINEAR MAGNETIC RECORDING MEDIUM

(75) Inventors: Masato Horie, Otsu (JP); Takuji Higashioji, Otsu (JP); Nozomi Yokoyama, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/822,350

(22) PCT Filed: Sep. 16, 2011

(86) PCT No.: PCT/JP2011/071238
§ 371 (c)(1),
(2), (4) Date: Mar. 20, 2013

(87) PCT Pub. No.: WO2012/043281
PCT Pub. Date: Apr. 5, 2012

(65) Prior Publication Data
US 2013/0172515 A1   Jul. 4, 2013

(30) Foreign Application Priority Data

Sep. 27, 2010   (JP) .................................. 2010-214825
Jun. 2, 2011     (JP) .................................. 2011-123993

(51) Int. Cl.
| | | |
|---|---|---|
| *C08G 63/183* | (2006.01) | |
| *C08G 63/13* | (2006.01) | |
| *C08G 63/137* | (2006.01) | |
| *C08G 63/189* | (2006.01) | |
| *C08G 63/199* | (2006.01) | |
| *C08G 63/88* | (2006.01) | |

(52) U.S. Cl.
CPC ............. *C08G 63/183* (2013.01); *C08G 63/13* (2013.01); *C08G 63/137* (2013.01); *C08G 63/189* (2013.01); *C08G 63/199* (2013.01); *C08G 63/88* (2013.01)
USPC ...................... 528/308.1; 528/308.2; 528/425

(58) Field of Classification Search
USPC .................................... 528/308.1, 308.2, 425
See application file for complete search history.

(56) References Cited

U.S. PATENT DOCUMENTS

| | | | | |
|---|---|---|---|---|
| 6,197,430 | B1 * | 3/2001 | Asakura et al. | 428/847.2 |
| 6,319,587 | B1 * | 11/2001 | Okazaki et al. | 428/141 |
| 2009/0297888 | A1 * | 12/2009 | Horie et al. | 428/846.4 |

FOREIGN PATENT DOCUMENTS

| | | |
|---|---|---|
| JP | 5-261805 A | 10/1993 |
| JP | 5-286028 A | 11/1993 |
| JP | 7-299863 A | 11/1995 |
| JP | 7-302421 A | 11/1995 |
| JP | 2001030350 A * | 2/2001 |
| JP | 2005-298712 A | 10/2005 |
| JP | 2009-221277 A | 10/2009 |
| JP | 2010-031116 A | 2/2010 |
| JP | 2010-037448 A | 2/2010 |

OTHER PUBLICATIONS

Sichina ("DSC as Problem Solving tool: Measurement of Percent Crystallinity of Thermoplastics", Perkin Elmer, p. 1-4, 2000).*
Japanese translation of JP__2001030350__A.*

* cited by examiner

*Primary Examiner* — Richard A Huhn
(74) *Attorney, Agent, or Firm* — DLA Piper LLP (US)

(57) ABSTRACT

A biaxially oriented polyester film has a ratio of Young's modulus in the transverse direction to Young's modulus in the machine direction of 1.5 to 3, an average value of refractive indices in the machine direction, in the transverse direction, and in the thickness direction of 1.590 to 1.680, a minor melting peak temperature of 160 to 190° C., and a coefficient of hygroscopic expansion in the transverse direction of 0 to 6 ppm/% RH.

13 Claims, 1 Drawing Sheet

BIAXIALLY ORIENTED POLYESTER FILM AND LINEAR MAGNETIC RECORDING MEDIUM

RELATED APPLICATIONS

This application is a §371 of International Application No. PCT/JP2011/071238, with an international filing date of Sep. 16, 2011 (WO 2012/043281 A1, published Apr. 5, 2012), which is based on Japanese Patent Application Nos. 2010-214825, filed Sep. 27, 2010, and 2011-123993, filed Jun. 2, 2011, the subject matter of which is incorporated herein by reference.

TECHNICAL FIELD

This disclosure relates to a biaxially oriented polyester film used in a magnetic recording medium such as a magnetic tape and to a linear magnetic recording medium in which a magnetic layer is provided on the biaxially oriented polyester film.

BACKGROUND

Biaxially oriented polyester films have been used in various applications because of their excellent thermal properties, dimensional stability, mechanical properties, and ease of control of surface morphology and, in particular, are well known to be useful as a substrate, for example, for a magnetic recording medium that is highly strengthened using stretching techniques. In recent years, in magnetic recording media such as a magnetic tape, higher-density recording for weight saving of materials, miniaturization, and increase in capacity has been demanded. For the higher-density recording, it is effective to use a shorter recording wavelength and a smaller recording track. However, a smaller recording track has a problem in that deviation of the recording track is likely to occur because of heat during tape running and deformation due to temperature/humidity changes during tape storage. Accordingly, there has been an increased demand for improvement of properties such as dimensional stability in the transverse direction in the usage environment and storage environment of a tape.

From this standpoint, aromatic polyamides with high rigidity which are superior to biaxially oriented polyester films in strength and dimensional stability have been sometimes used for a substrate. However, aromatic polyamides are expensive and costly, and are not practical as a substrate in a versatile recording medium.

There have been disclosed techniques for reducing a coefficient of hygroscopic expansion using a polymer alloy or copolymerization to improve dimensional stability in the transverse direction of a polyester film (JP 2010-37448 A, JP 2010-31116 A and JP 2009-221277 A).

However, the techniques disclosed in JP '448, JP '116 and JP '277 have problems in that slittability deteriorates; breakage is likely to occur during film formation; and the like.

It could therefore be helpful to provide an excellent biaxially oriented polyester film, particularly, a biaxially oriented polyester film that undergoes little dimensional change due to environmental changes when used as a magnetic recording medium and has excellent storage stability and good slittability, film forming ability, and processing suitability.\

SUMMARY

We thus provide a biaxially oriented polyester film having a ratio of Young's modulus in the transverse direction ETD to Young's modulus in the machine direction EMD, ETD/EMD, of 1.5 to 3, an n_bar, which represents the average of a refractive index in the machine direction nMD, a refractive index in the transverse direction nTD, and a refractive index in the thickness direction nZD ((nMD+nTD+nZD)/3), of 1.590 to 1.680, a minor melting peak temperature T-meta of 160 to 190° C., and a coefficient of hygroscopic expansion in the transverse direction of 0 to 6 ppm/% RH.

A biaxially oriented polyester film that undergoes little dimensional change due to environmental changes when used as a magnetic recording medium and has excellent storage stability and good slittability, film forming ability, and processing suitability can be obtained.

DESCRIPTION OF SYMBOLS

1: Laser oscillator
2: Light receiving unit
3: Load detector
4: Load
5: Free roll
6: Free roll
7: Free roll
8: Free roll
9: Magnetic tape
10: Laser beam

DETAILED DESCRIPTION

We discovered that crystallinity of a molecular chain and high orientation of amorphous are important for hygroscopic expansion of a biaxially oriented polyester film and, in addition, that crystallite size, degree of crystal orientation, and rigid amorphous volume significantly contribute to dimensional stability and processing suitability. Further, we discovered that a biaxially oriented polyester film that exhibits excellent dimensional stability, storage stability, slittability, film forming ability, and processing suitability when used as a magnetic tape can be obtained by using specific processes such as performing transverse stretching in two steps after longitudinal stretching, setting the temperature of the second stretching near the temperature of heat-setting treatment which is performed last, and increasing the temperature of preheating before the transverse stretching to positively cause crystallization.

In the description below, the machine direction, MD, and the longitudinal direction are used with the same meaning, and the transverse direction, TD, and the lateral direction are used with the same meaning MD stretching is a stretching in the machine direction of a film, and TD stretching is a stretching in the transverse direction of a film. TD stretching 1 and TD stretching 2 are the first stretching and the second stretching in a two-step stretching in the transverse direction of a film, respectively.

A polyester film is one which is composed of a polymer comprising, for example, an acid component such as aromatic dicarboxylic acid, alicyclic dicarboxylic acid, or aliphatic dicarboxylic acid and a diol component as a constituent unit (polymerization unit).

Examples of aromatic dicarboxylic acid components can include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, 4,4'-diphenyl sulfone dicarboxylic acid, and the like, and, particularly preferably, terephthalic acid, phthalic acid, and 2,6-naphthalene dicarboxylic acid can be used. Examples of alicyclic dicarboxylic acid components can include cyclohexanedicarboxylic acid and the like. Examples of aliphatic dicarboxylic acid components can include adipic acid, suberic acid, sebacic acid, dodecanedioic acid, and the like. These acid components may be used alone or in combination of two or more thereof.

Examples of diol components can include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2'-bis(4'-β-hydroxyethoxyphenyl)propane, and the like, among which ethylene glycol, 1,4-butanediol, 1,4-cyclohexanedimethanol, diethylene glycol, and the like can preferably be used, and particularly preferably, ethylene glycol and the like can be used. These diol components may be used alone or in combination of two or more thereof.

In the polyester, monofunctional compounds such as lauryl alcohol and phenyl isocyanate may be copolymerized, or, for example, trifunctional compounds such as trimellitic acid, pyromellitic acid, glycerol, pentaerythritol, 2,4-dioxy benzoic acid, and the like may be copolymerized to the extent that the polymer does not excessively branch or cross-link and is substantially linear. Further, in addition to the acid component and the diol component, aromatic hydroxycarboxylic acids such as p-hydroxybenzoic acid, m-hydroxybenzoic acid, and 2,6-hydroxynaphthoic acid, and p-aminophenol, p-aminobenzoic acid, and the like can be further copolymerized in such small amounts that will not impair the desired effects.

As the polyester, polyethylene terephthalate (PET) and polyethylene naphthalate (polyethylene-2,6-naphthalate, PEN) are preferred. In particular, the main component is preferably polyethylene terephthalate because a process of increasing a crystallite size or a degree of crystal orientation is easily applied. Main component herein refers to a component that constitutes 80% by mass or more in film composition. Further, copolymers or modified products thereof may be used, or polymer alloys with other thermoplastic resins may be used. Polymer alloy herein refers to a multicomponent polymer, and it may be a block copolymer obtained by copolymerization or a polymer blend obtained by mixture or the like. In particular, a polymer compatible with the polyester is preferred, and, for example, a polyetherimide resin is preferred. As a polyetherimide resin, for example, one which is shown below can be used:

wherein, in the formula above, $R^1$ is a divalent aromatic or aliphatic residue having 6 to 30 carbon atoms, and $R^2$ is a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group chain-terminated by an alkylene group having 2 to 8 carbon atoms.

Examples of the $R^1$ and $R^2$ above include aromatic residues represented by the following formulae:

wherein n is an integer of 2 or more, preferably an integer from 20 to 50.

From the standpoint of affinity for the polyester, cost, melt moldability, and the like, preferred is a polymer having a repeating unit represented by the following formula, which is a condensation product of 2,2-bis[4-(2,3-dicarboxyphenoxy)phenyl]propane dianhydride and m-phenylenediamine or p-phenylenediamine:

or

-continued

Such polyetherimides are available from SABIC Innovative Plastics under the trade name "Ultem" (registered trademark). These are known under the registered trademark "Ultem 1000," "Ultem 1010," "Ultem 1040," "Ultem 5000," "Ultem 6000" and "Ultem XH 6050" series, "Extern XH," "Extem UH" and the like.

The biaxially oriented polyester film preferably has a Young's modulus in the machine direction of 3.0 to 4.4 GPa. If the Young's modulus in the machine direction is in the range described above, when the biaxially oriented polyester film is used for a magnetic recording medium, the magnetic recording medium will have good storage stability to tension during storage. To increase to more than 4.4 GPa, the MD ratio should be increased, and then film forming ability is likely to decrease. The lower limit of the Young's modulus in the machine direction is more preferably 3.5 GPa and still more preferably 4.0 GPa. A more preferred range is 3.5 to 4.4 GPa, and a still more preferred range is 4.0 to 4.4 GPa. The Young's modulus in the machine direction can be controlled by the ratio of the MD stretching. The higher the MD stretching ratio is, the higher the MD Young's modulus becomes.

The biaxially oriented polyester film preferably has a Young's modulus in the transverse direction of 6.0 to 12 GPa. If the Young's modulus in the transverse direction is in the range described above, when the biaxially oriented polyester film is used for a magnetic recording medium, the magnetic recording medium will have good dimensional stability to environmental changes during playback of recordings. The upper limit of the Young's modulus in the transverse direction is more preferably 10 GPa and still more preferably 9.0 GPa. The lower limit of the Young's modulus in the transverse direction is more preferably 6.2 GPa and still more preferably 6.5 GPa. A more preferred range is 6.2 to 10 GPa, and a still more preferred range is 6.5 to 9.0 GPa. The Young's modulus in the transverse direction can be controlled by the temperature or ratio of the TD stretching 1 and 2. In particular, the total ratio of the TD stretching has an influence, and the higher the total ratio of the TD stretching (TD stretching 1 ratio×TD stretching 2 ratio) is, the higher the TD Young's modulus becomes.

The biaxially oriented polyester film has a ratio of Young's modulus in the transverse direction ETD to Young's modulus in the machine direction EMD, ETD/EMD, of 1.5 to 3.0. When the value of ETD/EMD is outside the range of 1.5 to 3.0, it will be difficult to satisfy all of dimensional stability and storage stability, slittability, and film forming ability. A more preferred upper limit is 2.5, and still more preferred is 2.0. A more preferred lower limit is 1.55, and still more preferred is 1.6. A preferred range is 1.55 to 3; more preferred is 1.55 to 2.5; and still more preferred is 1.6 to 2.0. ETD/EMD can be controlled by the ratio of the total ratio of the TD stretching to the MD stretching ratio. The larger the ratio of the total ratio of the TD stretching to the MD stretching ratio ((TD stretching 1 ratio×TD stretching 2 ratio)/MD stretching ratio) is, the larger ETD/EMD becomes.

The biaxially oriented polyester film has a coefficient of hygroscopic expansion in the transverse direction of 0 to 6 ppm/% RH. If the coefficient of hygroscopic expansion is more than 6 ppm/% RH, when the biaxially oriented polyester film is used for a magnetic recording medium, deformation due to humidity changes will be significant and dimensional stability deteriorates. A more preferred upper limit is 5.5 ppm/% RH, and still more preferred is 5 ppm/% RH. A more preferred range is 0 to 5.5 ppm/% RH, and still more preferred is 0 to 5 ppm/% RH. The coefficient of hygroscopic expansion, which is a physical property influenced by the degree of tension of molecular chains, can be controlled by the ratio of the TD stretching 1 ratio to the TD stretching 2 ratio, and can be controlled also by the total ratio of the TD stretching or the ratio of the total ratio of the TD stretching to the MD stretching ratio. The larger the ratio of the TD stretching 1 ratio to the TD stretching 2 ratio (TD stretching 1 ratio/TD stretching 2 ratio) is, the smaller the coefficient of hygroscopic expansion becomes. Further, the higher the total TD stretching ratio (TD stretching 1 ratio×TD stretching 2 ratio) is, the smaller the coefficient of hygroscopic expansion becomes. Further, the larger the ratio of the total ratio of the TD stretching to the MD stretching ratio ((TD stretching 1 ratio×TD stretching 2 ratio)/MD stretching ratio) is, the smaller the coefficient of hygroscopic expansion tends to be.

The biaxially oriented polyester film has an average refractive index n_bar of 1.590 to 1.680. When the n_bar is less than 1.590, crystallinity and orientation are insufficient, and storage stability and slittability deteriorate. When the n_bar is more than 1.680, crystallinity proceeds too far due to orientation relaxation, and dimensional stability deteriorates. A preferred upper limit is 1.615. A preferred range is 1.590 to 1.615. The n_bar can be controlled by heat-setting temperature, and can be controlled also by conditions of the TD stretching 1 and 2. The n_bar refers to a value calculated from ((nMD+nTD+nZD)/3), wherein nMD is a refractive index in the machine direction; nTD is a refractive index in the transverse direction; and nZD is a refractive index in the thickness direction. The lower the heat-setting temperature is, the lower the n_bar becomes. Further, the larger the ratio of the TD stretching 1 ratio to the TD stretching 2 ratio (TD stretching 1 ratio/TD stretching 2 ratio) is, the smaller the n_bar becomes.

The biaxially oriented polyester film has a minor melting peak temperature just below the melting point, T-meta, of 160 to 190° C. Structural fixation is insufficient due to heat deficiency, and storage stability deteriorates when it is less than 160° C. Orientation relaxation occurs due to excessive heat and dimensional stability deteriorates when it is more than 190° C. A more preferred upper limit is 188° C., and still more preferred is 185° C. A more preferred lower limit is 170° C., and still more preferred is 175° C. A more preferred range is 170 to 188° C., and still more preferred is 175 to 185° C. The T-meta can be controlled by heat-setting temperature. The T-meta becomes high when the heat-setting temperature is high.

The biaxially oriented polyester film preferably has a birefringence Δn of −0.060 to −0.020. When the Δn is less than −0.060, transverse orientation is too strong and, therefore, slittability deteriorates. Transverse orientation is weak and width dimensional stability deteriorates when it is more than −0.020. A more preferred upper limit is −0.025, and still more preferred is −0.030. A more preferred lower limit is −0.055, and more preferred is −0.050. A preferred range is −0.060 to −0.025; more preferred range is −0.055 to −0.025; and still more preferred is −0.050 to −0.030. The Δn can be controlled by the ratio of the total ratio of the TD stretching to the MD stretching ratio. The birefringence Δn refers to a value calculated from nMD−nTD, wherein nMD is a refractive index in the machine direction, and nTD is a refractive index in the transverse direction. The smaller the ratio of the total ratio of the TD stretching to the MD stretching ratio ((TD stretching 1 ratio×TD stretching 2 ratio)/MD stretching ratio) is, the larger the Δn tends to be.

The biaxially oriented polyester film preferably has a heat of crystal melting ΔHm of 30 to 45 J/g. Crystallinity is low and slittability can deteriorate when it is less than 30 J/g. Crystallization proceeds too far and, consequently, orientation relaxation occurs, and dimensional stability is likely to deteriorate when it is more than 45 J/g. A more preferred upper limit is 42 J/g, and still more preferred is 40 J/g. A more preferred lower limit is 32 J/g, and still more preferred is 35 J/g. Most preferred is 36 J/g. A more preferred range is 32 to 42 J/g; still more preferred is 35 to 40 J/g; and yet still more preferred is 36 to 40 J/g. The heat of crystal melting ΔHm can be controlled by heat-setting temperature and conditions of the TD stretching 1 and 2. The lower the heat-setting temperature is, the lower the ΔHm becomes. Further, the larger the ratio of the TD stretching 1 ratio to the TD stretching 2 ratio (TD stretching 1 ratio/TD stretching 2 ratio) is, the smaller the ΔHm becomes.

When the biaxially oriented polyester film is mainly composed of polyethylene terephthalate, the crystallite size in the crystal backbone direction by wide-angle x-ray in the transverse direction is preferably 5.5 to 8.0 nm. The distance between crystallites increases, and the amount of shrinkage of amorphous chains increases and, consequently, processing suitability tends to deteriorate when it is less than 5.5 nm. To increase to more than 8.0 nm, it is necessary to grow crystals considerably, and film forming ability tends to deteriorate. A more preferred upper limit is 7.8 nm, and a still more preferred upper limit is 7.5 nm. A more preferred lower limit is 6.0 nm, and a still more preferred lower limit is 6.5 nm. A more preferred range is 6.0 to 7.8 nm, and a still more preferred range is 6.5 to 7.5 nm. The crystallite size can be controlled by preheating temperature particularly of the TD stretching 1. By setting the preheating temperature at or higher than the cold crystallization temperature of a film after MD stretching, the crystallite size can be increased.

When the biaxially oriented polyester film is mainly composed of polyethylene terephthalate, the degree of crystal orientation in the crystal backbone direction by wide-angle x-ray in the transverse direction is preferably 0.68 to 0.90. When it is more than 0.90, orientation in the transverse direction is too strong and, therefore, there is a tendency to deterioration of slittability and deterioration of stretchability. Deformation in the transverse direction is likely to occur and dimensional stability is likely to deteriorate when it is less than 0.68. A more preferred upper limit is 0.85, and a still more preferred upper limit is 0.80. A more preferred lower limit is 0.70, and a still more preferred lower limit is 0.75. A more preferred range is 0.70 to 0.85, and a still more preferred range is 0.75 to 0.80. The degree of crystal orientation, which indicates an arrangement of molecular chains, can be controlled by the ratio of the TD stretching 1 ratio to the TD stretching 2 ratio, and can be controlled also by the total ratio of the TD stretching or the ratio of the total ratio of the TD stretching to the MD stretching ratio. The larger the ratio of the TD stretching 1 ratio to the TD stretching 2 ratio (TD stretching 1 ratio/TD stretching 2 ratio) is, the higher the degree of crystal orientation becomes. Further, the higher the total ratio of the TD stretching (TD stretching 1 ratio×TD stretching 2 ratio) is, the higher the degree of crystal orientation becomes. Further, the larger the ratio of the total ratio of the TD stretching to the MD stretching ratio ((TD stretching 1 ratio×TD stretching 2 ratio)/MD stretching ratio) is, the higher the degree of crystal orientation tends to be. Further, heat-setting temperature is also involved, and the lower the heat-setting temperature is, the higher the degree of crystal orientation becomes. Furthermore, by setting the preheating temperature of the TD stretching 1 at or higher than the cold crystallization temperature of a film after MD stretching, the degree of crystal orientation can be increased.

The biaxially oriented polyester film preferably has a rigid amorphous volume Xra calculated using temperature-modulated DSC of 38 to 50%. When the Xra is more than 50%, orientation relaxation occurs, and dimensional stability tends to deteriorate. When the Xra is less than 38%, structural fixation is insufficient; storage stability is likely to deteriorate; and, in addition, processing suitability tends to deteriorate. A more preferred upper limit is 48%, and a still more preferred upper limit is 46%. A more preferred lower limit is 40%, and a still more preferred lower limit is 42%. A more preferred range is 40 to 48%, and a still more preferred range is 42 to 46%. The Xra can be controlled by heat-setting temperature, and the higher the heat-setting temperature is, the larger it becomes. Further, by setting the preheating temperature of the TD stretching 1 to higher than the cold crystallization temperature of a film after MD stretching, the Xra can be increased.

The thickness of the biaxially oriented polyester film can be appropriately determined depending on the intended use, and in linear magnetic recording medium application, preferred is generally 1 to 7 µm. When the thickness is less than 1 µm, electromagnetic conversion characteristics can decrease when the biaxially oriented polyester film is used as a magnetic tape. On the other hand, when the thickness is more than 7 µm, the tape length per roll of tape is short and, consequently, miniaturization and increase in capacity of the magnetic tape can be difficult. Thus, in high-density magnetic recording medium application, the lower limit of the thickness is preferably 2 µm and more preferably 3 µm, and the upper limit is preferably 6.5 µm and more preferably 6 µm. A more preferred range is 2 to 6.5 µm, and a still more preferred range is 3 to 6 µm.

The biaxially oriented polyester film described above is produced, for example, as described below.

First, a polyester film constituting the biaxially oriented polyester film is produced. To produce a polyester film, for example, polyester pellets are melted using an extruder, discharged from a die, and then solidified by cooling to be formed into a sheet. In this process, to remove unmelted materials in the polymer, it is preferable to filter the polymer through a fiber sintered stainless metal filter.

To control the surface properties of the polyester film and provide smoothness, wear resistance, scratch resistance, and the like, it is preferable to add inert particles. Examples of the inert particles include inorganic particles and organic particles, for example, inorganic particles such as clay, mica, titanium oxide, calcium carbonate, kalion, talc, wet silica, dry silica, colloidal silica, calcium phosphate, barium sulfate, alumina, and zirconia; organic particles composed of acrylic acid, styrene resin, thermoset resin, silicone, imide compound, and the like; particles precipitated, for example, by a catalyst added during a polyester polymerization reaction (so-called internal particles); and the like.

In addition, to the extent that our films are not impaired, various additives, for example, a compatibilizer, plasticizer, anti-weathering agent, antioxidant, heat stabilizer, lubricant, antistatic agent, brightening agent, coloring agent, conductive agent, crystal nucleating agent, UV absorber, flame retardant, flame retardant adjuvant, pigment, dye, and the like may be added.

Then, the sheet described above is biaxially stretched in the machine direction and in the transverse direction and then heat treated. To improve dimensional stability in the transverse direction, it is preferable to carry out the stretching process in the transverse direction in two or more steps. Namely, a method in which transverse re-stretching is carried out is preferred because a high-strength film most suitable as a magnetic tape with high dimensional stability is readily obtained.

A preferred stretching method is the sequential biaxial stretching method in which, for example, stretching is carried out in the transverse direction after stretching in the machine direction.

A method of producing a substrate will now be described with reference to a representative example in which polyethylene terephthalate (PET) is used as polyester. Needless to say, this disclosure is not limited to a substrate using a PET film, and other polymers may be used. For example, when polyethylene-2,6-naphthalenedicarboxylate or the like, which has a high glass transition temperature and a high melting point, is used to constitute a polyester film, it is only required that extrusion and stretching should be carried out at a temperature higher than the temperature shown below.

First, polyethylene terephthalate is provided. Polyethylene terephthalate is produced by either of the processes below, i.e., (1) a process in which, using terephthalic acid and ethylene glycol as a raw material, a low-molecular-weight polyethylene terephthalate or oligomer is obtained by direct esterification reaction, and further a polymer is obtained by subsequent polycondensation reaction using antimony trioxide or a titanium compound as a catalyst, (2) a process in which, using dimethyl terephthalate and ethylene glycol as a raw material, a low-molecular-weight product is obtained by transesterification reaction, and further a polymer is obtained by subsequent polycondensation reaction using antimony trioxide or a titanium compound as a catalyst. In these processes, the esterification reaction proceeds even without a catalyst, but the transesterification reaction is generally allowed to proceed using a compound of manganese, calcium, magnesium, zinc, lithium, titanium, or the like as a catalyst. A phosphorus compound may optionally be added for the purpose of inactivating the catalyst used in the reaction after substantial completion of the transesterification reaction.

To incorporate inert particles into the polyester constituting the film, preferred is a method in which inert particles are dispersed in ethylene glycol at a predetermined ratio to form a slurry, and this ethylene glycol is added during polymerization. When adding the inert particles, the particles are dispersed well, for example, if the particles in the form of water sol or alcohol sol obtained when synthesizing the inert particles are added without being dried once. Further, a method in which a water slurry of inert particles is directly mixed with PET pellets and kneaded into PET using a vented twin-screw kneading extruder is also effective. As a method of adjusting the content of the inert particles, a method in which master pellets of inert particles of high concentration are prepared by the method described above, and the master pellets are diluted with PET containing substantially no inert particles during film formation to thereby adjust the content of the inert particles is effective.

Then, the pellets of PET obtained are dried under reduced pressure at 180° C. for 3 hours or more. The pellets are then fed to an extruder heated to 270 to 320° C. under a stream of nitrogen or under reduced pressure so that intrinsic viscosity does not decrease. Then, the resultant was extruded from a slit die and cooled on a casting roll to obtain an unstretched film. In this process, it is preferable to use various filters, for example, a filter made of a material such as sintered metal, porous ceramic, sand, or wire net to remove foreign matter and modified polymer. Further, a gear pump may optionally be provided to improve constant supply ability. To layer the film, two or more extruders and a manifold or joint block are used to melt layer a plurality of different polymers.

Then, using a longitudinal stretching machine equipped with several rolls, the unstretched film thus obtained is stretched in the longitudinal direction (MD stretching) utilizing the difference in peripheral speed of rolls, and then stretching in the lateral direction is performed in two steps (TD stretching 1, TD stretching 2) using a stenter. This biaxial stretching method will be described.

First, an unstretched film is MD stretched. The stretching temperature in the MD stretching varies depending on the type of polymer used and can be determined with reference to a glass transition temperature Tg of the unstretched film. It is preferably in the range of Tg−10 to Tg+15° C. and more preferably Tg° C. to Tg+10° C. When the stretching temperature is lower than the range described above, film breakage occurs frequently and productivity decreases, and it can be difficult to perform stretching stably by two-step TD stretching after MD stretching which is a feature of our films. The MD stretching ratio is preferably 2.5 to 4.0, more preferably 2.8 to 3.8, and still more preferably 3.0 to 4.0. To stably perform the two-step TD stretching, polymer structure in a film after MD stretching is important. If orientation in the MD direction is excessive, molecular chains are entangled during the TD stretching to cause local stress, and consequently film breakage occurs. To prevent the occurrence of local stress, it is important to generate a microcrystalline state that acts as a stress propagating portion and provide a moderate MD orientation. Microcrystals can be judged in a simplified manner using crystallinity analysis by thermal analysis (DSC). The crystallinity is preferably 20 to 30% and more preferably 23 to 28%. The judgment can be made also by birefringence $\Delta n$ as an orientation parameter after MD stretching, and the $\Delta n$ is preferably 0.011 to 0.015. The cold crystallization temperature is preferably 90 to 100° C.

Then, the TD stretching is carried out using a stenter. To improve dimensional stability in the transverse direction to thereby obtain a biaxially oriented polyester film having good storage stability, slittability, and film forming ability, it is important to stretch in the transverse direction in two steps in zones at different temperatures. First, the stretching ratio of the first stretching (TD stretching 1) is preferably 3.0 to 5.0, more preferably 3.2 to 4.5, and still more preferably 3.5 to 4.0. The stretching temperature of the TD stretching 1 is preferably in the range of (MD stretching temperature+5) to (MD stretching temperature+50)° C. and more preferably in the range of (MD stretching temperature+10) to (MD stretching temperature+30)° C. The second stretching (TD stretching 2) is then performed continuously in the stenter. The stretching ratio of the TD stretching 2 is preferably 1.05 to 2, more preferably 1.1 to 1.8, and still more preferably 1.2 to 1.5. The stretching temperature of the TD stretching 2 is preferably in the range of (TD stretching 1 temperature+50) to (TD stretching 1 temperature+100)° C. and more preferably in the range of (TD stretching 1 temperature+60) to (TD stretching 1 temperature+90)° C. By increasing to higher than the stretching temperature in the previous step, motility of molecular chains improves, and the stretching can be carried out while moderately disentangling the entanglement of molecular chains due to the stretching in the previous step. In particular, the TD stretching 1 and the TD stretching 2 are stretching in the same direction, and thus it is necessary to increase the temperature difference.

Further, to increase the degree of crystal orientation and crystallite size of the biaxially oriented polyester film, preheating temperature of the TD stretching 1 is preferably set at or higher than the cold crystallization temperature of a film after MD stretching. More preferred is (cold crystallization temperature of a film after MD stretching+3)° C. to (cold crystallization temperature of a film after MD stretching+7)° C. By providing heat at or higher than the cold crystallization temperature of a film after MD stretching by the preheating before the TD stretching 1, microcrystals are formed in the film, which microcrystals act on nodes of the stretching, and stress propagates more uniformly. Consequently, strain decreases, and molecular chains can be uniformly oriented. If the preheating temperature of the TD stretching 1 is higher than (the cold crystallization temperature of a film after MD stretching+7)° C., the microcrystals formed grow, and stretchability tends to deteriorate. Further, when heat-setting treatment is performed via our stretching process, crystal orientation is high, and crystallite size increases in the transverse direction. The degree of crystal orientation significantly contributes to dimensional stability, and the higher the degree of crystal orientation is, the better the dimensional stability becomes. However, if the degree of crystal orientation is increased simply by increasing the stretching ratio or the like, strain of molecular chains increases, and shrinkage due to heat and the like are likely to occur. Consequently, problems such as width reduction and wrinkling are likely to occur in the process of processing into a magnetic tape. When crystal size is likely to increase in the transverse direction and crystallite size increases by setting the preheating temperature of the TD stretching 1 at or higher than the cold crystallization temperature of a film after MD stretching, the distance between crystallites is considered to be shorter, and the length of shrinkage of amorphous chains decreases. Consequently, shrinkage due to heat decreases, and processing suitability is considered to be good.

Then, the stretched film is subjected to a heat-setting treatment under tension or while being relaxed in the transverse direction. For the heat-setting treatment conditions, the heat-setting temperature is preferably 160 to 200° C. The upper limit of the heat-setting temperature is more preferably 190° C. and still more preferably 185° C. The lower limit of the heat-setting temperature is more preferably 170° C. and still more preferably 175° C. A more preferred range is 170 to 190° C., and still more preferred is 175 to 185° C. It is preferred that the heat-setting treatment be carried out for a time in the range of 0.5 to 10 seconds and at a relaxation rate of 0 to 2%. After the heat-setting treatment, the temperature is rapidly cooled to room temperature while reducing the tension exerted on the film by opening clips holding the film. Thereafter, film edges are removed for taking up on a roll, and the biaxially oriented polyester film can be obtained.

To achieve the desired dimensional stability, storage stability, slittability, and film forming ability, the ratio of the total ratio of the TD stretching to the MD stretching ratio is important. The value of "total ratio of TD stretching/MD stretching ratio" is preferably 1.2 to 2.0, more preferably 1.3 to 1.8, and still more preferably 1.4 to 1.6. The value of "total ratio of TD stretching/MD stretching ratio" gives an indication for controlling the balance of orientation of molecular chains, and to enhance particularly dimensional stability, it is necessary to enhance TD orientation. However, simply increasing only the total ratio of the TD stretching has a limited effect, and the effect of the subsequent TD stretching can be maximized by moderately controlling the MD stretching. This means that some degree of entanglement of molecular chains is necessary for the degree of orientation-improving effect of the stretching and that the degree of entanglement of molecular chains necessary for maximizing the TD orientation effect of the TD stretching is controlled by the former MD stretching. The optimal value of the MD stretching ratio is associated with the total ratio of the latter TD stretching, and therefore the ratio of the stretching ratios mentioned above eventually allows controlling to a preferred state.

Further, the stretching ratio of the TD stretching 1 to the TD stretching 2 is important for stable film formation. The value of "TD stretching 1 ratio/TD stretching 2 ratio" is preferably 1.8 to 4.1, more preferably 2.2 to 3.5, and still more preferably 2.5 to 3.0. The TD stretching is carried out in two steps, and it is preferred that the stretching ratio of the TD stretching 1 be relatively high. The reason is that, to enhance the TD orientation, in general, the larger the ratio of the final stretching is, the more the orientation can be enhanced, and the TD stretching 2 needs to be carried out at a higher temperature than in the TD stretching 1, which high temperature makes it easy to form crystals. With regard to the dimensional stability, it is important that not the commonly called orientation including that of crystals but orientation in amorphous regions be high, and the orientation in amorphous regions is likely to relax if the TD stretching 2 is carried out at a high ratio. Namely, it is preferred that the TD stretching 1 be carried out at somewhat high ratio for high orientation and the TD stretching 2 be carried out to the extent that the high orientation does not relax.

The heat-setting treatment is carried out after the TD stretching, and the heat treatment is preferably carried out at almost the same temperature as in the TD stretching 2 to suppress orientation relaxation of a film. The heat-setting treatment is carried out with the film being under tension or relaxed in the transverse direction preferably at the stretching temperature of the TD stretching 2-5 to the stretching temperature of the TD stretching 2+5° C., more preferably at the stretching temperature of the TD stretching 2-3 to the stretching temperature of the TD stretching 2+3° C., and still more preferably at the same temperature as that of the TD stretching 2. By setting the stretching temperature of the TD stretching 2 near the heat-setting temperature, molecular structure can be established in a stretched state, and strain of molecular chains can be removed while maintaining the high orientation to prevent deterioration of storage stability and slittability. When there is a difference between the stretching temperature of the TD stretching 2 and the heat-setting temperature, e.g., when the heat-setting temperature is too high, relaxation is likely to occur and dimensional stability tends to decrease, and when the heat-setting temperature is too low, crystallinity tends to decrease and slittability tends to decrease.

A biaxially oriented polyester film having good dimensional stability, storage stability, slittability, and film forming ability can be obtained by performing a stretching process "MD stretching-TD stretching 1-TD stretching 2." A biaxially oriented polyester film with all the physical properties being good can hardly be obtained by a stretching process such as "MD stretching-TD stretching" in which the MD stretching and the TD stretching are each carried out in one step or "MD stretching 1-TD stretching 1-MD stretching 2-TD stretching 2" in which the MD stretching and the TD stretching are alternately carried out in two steps.

Our method of producing a magnetic recording medium will now be described.

The substrate for a magnetic recording medium (the biaxially oriented polyester film) obtained as described above is slit, for example, to a 0.1 to 3 m width, and as the slit substrate is conveyed at a speed of 20 to 300 m/min and a tension of 50 to 300 N/m, magnetic paint and non-magnetic paint are applied in layers to one surface (A surface) using an extrusion coater. The magnetic paint is applied as an upper layer at a thickness of 0.1 to 0.3 µm, and the non-magnetic paint is applied as an underlayer at a thickness of 0.5 to 1.5 µm. Thereafter, the substrate coated with the magnetic paint and the non-magnetic paint is magnetically oriented and dried at a temperature of 80 to 130° C. Then, a back coating is applied to the opposite surface (B surface) at a thickness of 0.3 to 0.8 µm, and the substrate is calendered and then taken up. The calendering is carried out using a small test calendering apparatus (steel/nylon roll, five rolls) at a temperature of 70 to 120° C. and a line pressure of 0.5 to 5 kN/cm. Thereafter, the substrate is aged at 60 to 80° C. for 24 to 72 hours and slit to a ½ inch (1.27 cm) width to prepare a pancake. Then, a specific length of the pancake is incorporated into a cassette to form a cassette tape-type magnetic recording medium.

Examples of the composition of magnetic paint and the like include, for example, the composition as described below:

Composition of Magnetic Paint
Ferromagnetic metal powder: 100 parts by mass
Modified vinyl chloride copolymer: 10 parts by mass
Modified polyurethane: 10 parts by mass
Polyisocyanate: 5 parts by mass
2-ethylhexyl oleate: 1.5 parts by mass
Palmitin acid: 1 part by mass
Carbon black: 1 part by mass
Alumina: 10 parts by mass
Methyl ethyl ketone: 75 parts by mass
Cyclohexanone: 75 parts by mass
Toluene: 75 parts by mass
Composition of Back Coating
Carbon black (average particles size: 20 nm): 95 parts by mass
Carbon black (average particles size: 280 nm): 10 parts by mass
Alumina: 0.1 parts by mass
Modified polyurethane: 20 parts by mass
Modified vinyl chloride copolymer: 30 parts by mass
Cyclohexanone: 200 parts by mass
Methyl ethyl ketone: 300 parts by mass
Toluene: 100 parts by mass.

The magnetic recording medium can be suitably used in, for example, data recording applications, specifically, for backing up computer data (for example, a linear tape type recording medium (such as LTO4 and LTO5)) and for recording digital pictures such as images.

Methods for Measuring Physical Properties and Methods for Evaluating Effects

The methods for measuring property values and methods for evaluating effects are as described below.

(1) Young's Modulus

The Young's modulus of a film is measured in accordance with ASTM-D882 (1997). An Instron-type tensile tester is used, and the conditions are as described below. The average value of five measurements is employed as the Young's modulus.

Measuring apparatus: Ultra-precise material testing machine MODEL 5848 manufactured by Instron Sample Size:
When measuring Young's modulus in the transverse direction of a film
2 mm in the machine direction of a film×12.6 mm in the transverse direction of a film
(The distance between grips is 8 mm in the transverse direction of a film)
When measuring Young's modulus in the machine direction of a film
2 mm in the transverse direction of a film×12.6 mm in the machine direction of a film
(The distance between grips is 8 mm in the machine direction of a film)

Tensile speed: 1 mm/min
Measurement environment: Temperature: 23° C., Humidity: 65% RH
The number of measurements: 5

(2) Coefficient of Hygroscopic Expansion in the Transverse Direction

In the transverse direction (TD direction) of a film, measurements were made under the following conditions, and the average value of three measurements is employed as the coefficient of hygroscopic expansion:

Measuring apparatus: Thermomechanical analyzer TMA-50 manufactured by Shimadzu Corporation (humidity generator: humidity atmosphere regulator HC-1 manufactured by ULVAC-RIKO, Inc.)

Sample size: 10 mm in the machine direction of a film×12.6 mm in the transverse direction of a film Load: 0.5 g
The number of measurements: 3
Measurement temperature: 30° C.

Measurement humidity: The dimension L (mm) of a film in the transverse direction was measured while being maintained at 40% RH for 6 hours. Then, the humidity was increased to 80% RH over 40 minutes and maintained at 80% RH for 6 hours, and then the film L' (mm) was measured. The amount of dimensional change in the transverse direction of a film $\Delta L$ (mm)=L'−L is determined, and a coefficient of hygroscopic expansion (ppm/% RH) is calculated from the following equation:

$$\text{Coefficient of hygroscopic expansion(ppm/\% RH)} = 10^6 \times \{(\Delta L/12.6)/(80-40)\}.$$

(3) Refractive Index

The refractive index was measured in accordance with JIS-K7142 (2008) using the following measuring apparatus:
Apparatus: Abbe refractometer 4T (manufactured by ATAGO CO., LTD.)
Light source: Sodium D-line
Measurement temperature: 25° C.
Measurement humidity: 65% RH
Mounting liquid: Methylene iodide, sulfur methylene iodide in the case of a refractive index of 1.74 or more
Average refractive index $\bar{n}=((nMD+nTD+nZD)/3)$
Birefringence $\Delta n=(nMD-nTD)$
nMD; Refractive index in the machine direction of a film
nTD; Refractive index in the transverse direction of a film
nZD; Refractive index in the thickness direction of a film.

(4) Melting Point (Tm), Minor Melting Peak Temperature (T-meta), Heat of Crystal Melting ($\Delta Hm$)

Measurements were made in accordance with JIS-K7121 (1987). DSC (RDC220) manufactured by Seiko Instruments, Inc. was used as a differential scanning calorimeter, and Disk Station (SSC/5200) manufactured by Seiko Instruments, Inc. was used as a data analyzer. A sample in an amount of 5 mg was placed on an aluminum pan, and the temperature was raised from 25° C. to 300° C. at a temperature rise rate of 20° C./min. At this time, the peak temperature of the melt endothermic peak observed was employed as the melting point (Tm), and the temperature of a minor endothermic peak that appears at a slightly lower temperature than the Tm was employed as the T-meta. The amount of heat calculated from the peak area of the Tm is employed as the heat of crystal melting ΔHm (5) Glass Transition Temperature (Tg)

The glass transition temperature is determined in accordance with JIS-K7121 (1987) by measuring specific heat using the following apparatus under the following conditions:
Apparatus: Temperature-modulated DSC manufactured by TA Instrument
Measurement Conditions
  Heating temperature: 270 to 570 K (RCS cooling method)
  Temperature calibration: Melting points of high-purity indium and tin
  Temperature modulation amplitude: ±1 K
  Temperature modulation period: 60 seconds
  Temperature raising step: 5 K
Sample weight: 5 mg
Sample container: Aluminum open-type container (22 mg)
Reference container: Aluminum open-type container (18 mg)

The glass transition temperature is calculated by the following equation:

Glass transition temperature=(Extrapolated glass transition onset temperature+Extrapolated glass transition finish temperature)/2.

(6) Width Dimensional Stability

A film slit to a 1 m width is conveyed at a tension of 200 N, and magnetic paint and non-magnetic paint of the compositions below are applied in layers to one surface (A surface) of a substrate using an extrusion coater (the upper layer is the magnetic paint, coating thickness: 0.2 μm, and the underlayer is the non-magnetic paint, coating thickness: 0.9 μm). The substrate is magnetically oriented and dried at a drying temperature of 100° C. A back coating of the composition below is then applied to the opposite surface (B surface), and then the substrate is calendered using a small test calendering apparatus (steel/nylon roll, five rolls) at a temperature of 85° C. and a line pressure of 2.0×10⁵ N/m and then taken up. The original tape above is slit to a ½ inch (12.65 mm) width to prepare a pancake. Then, 200-m length of the pancake is incorporated into a cassette to form a cassette tape.

Figure 1:
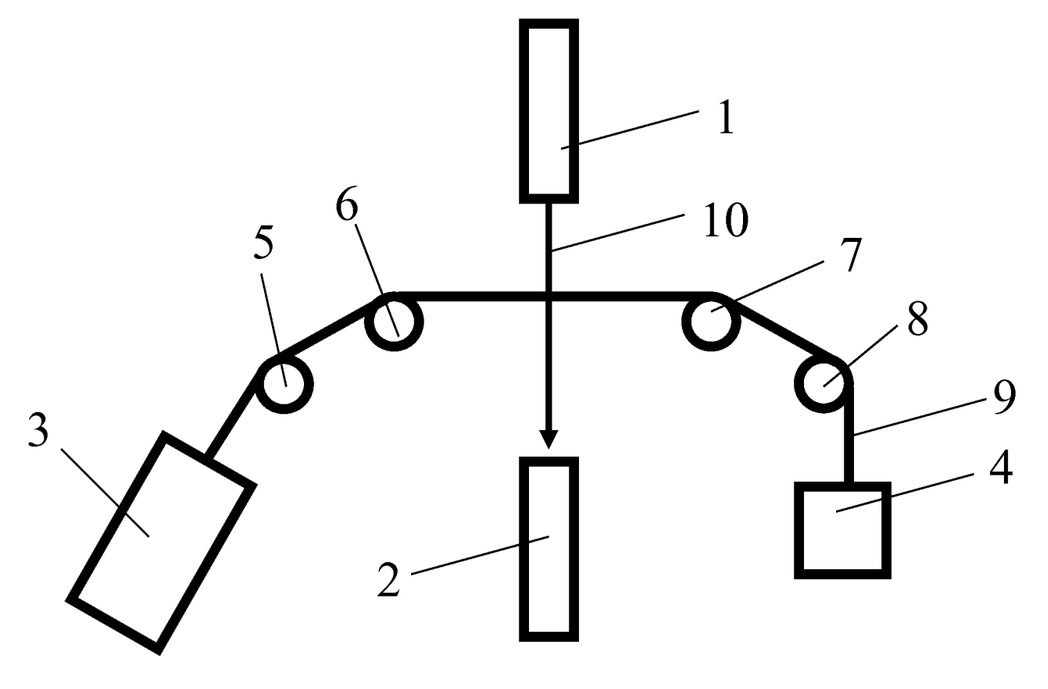
FIG. 1 is a schematic view of a sheet width measuring apparatus used when measuring a width dimension.

Composition of Magnetic Paint
Ferromagnetic metal powder: 100 parts by mass
  [Fe:Co:Ni:Al:Y:Ca=70:24:1:2:2:1 (mass ratio)]
  [Major axis length: 0.09 μm, axial ratio: 6, coercive force: 153 kA/m (1,922 Oe), saturation magnetization: 146 Am²/kg (146 emu/g), BET specific surface area: 53 m²/g, X-ray particles size: 15 nm]
Modified vinyl chloride copolymer (binder): 10 parts by mass
  (Average degree of polymerization: 280, epoxy group content: 3.1% by mass, sulfonic group content: 8×10⁻⁵ eq/g)
Modified polyurethane (binder): 10 parts by mass
  (Number average molecular weight: 25,000, sulfonic group content: 1.2×10⁻⁴ eq/g, glass transition point: 45° C.)
Polyisocyanate (hardener): 5 parts by mass
  (CORONATE L (trade name) available from NIPPON POLYURETHANE INDUSTRY CO., LTD.)
2-ethylhexyl oleate (lubricant): 1.5 parts by mass
Palmitin acid (lubricant): 1 part by mass
Carbon black (antistatic agent): 1 part by mass
  (Average primary particles size: 0.018 μm)
Alumina (abrasive): 10 parts by mass
  (α-alumina, average particles size: 0.18 μm)
Methyl ethyl ketone: 75 parts by mass
Cyclohexanone: 75 parts by mass
Toluene: 75 parts by mass Composition of Non-Magnetic Paint
Modified polyurethane: 10 parts by mass
  (Number average molecular weight: 25,000, sulfonic group content: 1.2×10⁻⁴ eq/g, glass transition point: 45° C.)
Modified vinyl chloride copolymer: 10 parts by mass
  (Average degree of polymerization: 280, epoxy group content: 3.1% by mass, sulfonic group content: 8×10⁻⁵ eq/g)
Methyl ethyl ketone: 75 parts by mass
Cyclohexanone: 75 parts by mass
Toluene: 75 parts by mass
Polyisocyanate: 5 parts by mass
  (CORONATE L (trade name) available from NIPPON POLYURETHANE INDUSTRY CO., LTD.)
2-ethylhexyl oleate (lubricant): 1.5 parts by mass
Palmitin acid (lubricant): 1 part by mass Composition of Back Coating
Carbon black: 95 parts by mass
  (Antistatic agent, average primary particles size: 0.018 μm)
Carbon black: 10 parts by mass
  (Antistatic agent, average primary particles size: 0.3 μm)
Alumina: 0.1 parts by mass
  (α-alumina, average particles size: 0.18 μm)
Modified polyurethane: 20 parts by mass
  (Number average molecular weight: 25,000, sulfonic group content: 1.2×10⁻⁴ eq/g, glass transition point: 45° C.)
Modified vinyl chloride copolymer: 30 parts by mass
  (Average degree of polymerization: 280, epoxy group content: 3.1% by mass, sulfonic group content: 8×10⁻⁵ eq/g)
Cyclohexanone: 200 parts by mass
Methyl ethyl ketone: 300 parts by mass
Toluene: 100 parts by mass A tape is taken out from a cartridge of the cassette tape, and a sheet width measuring apparatus produced as shown in FIG. 1 is placed in a thermo-hygrostat described below to measure a width dimension. The sheet width measuring apparatus shown in FIG. 1 is an apparatus for measuring a dimension in the transverse direction using a laser, in which apparatus a magnetic tape 9 is set on free rolls 5 to 8 and at the same time fixed to a load detector 3, and a weight 4 that serves as a load is suspended from an edge. When a laser beam 10 is applied to the magnetic tape 9, the laser beam 10 linearly oscillated from a laser oscillator 1 in the transverse direction enters a light receiving unit 2 with only at parts of the magnetic tape 9 being intercepted, and the width of the intercepted laser is measured as a width of the magnetic tape. The average value of three measurements is employed as the width.

Measuring apparatus: Sheet width measuring apparatus manufactured by AYAHA ENGINEERING CO., LTD.
Laser oscillator 1, light receiving unit 2: Laser dimension measuring machine LS-5040 manufactured by KEYENCE CORPORATION.
Load detector 3: Load cell CBE1-10K manufactured by NMB
Thermo-hygrostat: SE-25VL-A manufactured by Kato Inc.
Load 4: Weight (in the machine direction)
Sample size: width ½ inch×length 250 mm
Holding time: 5 hours
The number of measurements: Three measurements
Rate of Width Dimensional Change: Dimensional Stability
  Width dimensions (1A, 1B) are measured individually under two conditions, and the rate of dimensional change is calculated by the following equation. Specifically, the dimensional stability is evaluated according to the following criteria.

After a lapse of 24 hours under A conditions, $1_A$ is measured, and then $1_B$ is measured after a lapse of 24 hours under B conditions. A sample cut out from the point at 30 m from the beginning of a tape cartridge, a sample cut out from the point at 100 m, and a sample cut out from the point at 170 m, three in total, were measured. Evaluation C is "unacceptable."
A conditions: 10° C., 10% RH, tension: 0.8N
B conditions: 29° C., 80% RH, tension: 0.5N
Rate of Width Dimensional Change (ppm)=$10^6 \times ((1_B - 1_A)/1_A)$ AAA: The maximum value of the rate of width dimensional change is less than 450 (ppm)
AA: The maximum value of the rate of width dimensional change is not less than 450 (ppm) and less than 500 (ppm)
A: The maximum value of the rate of width dimensional change is not less than 500 (ppm) and less than 600 (ppm)
B: The maximum value of the rate of width dimensional change is not less than 600 (ppm) and less than 700 (ppm)
C: The maximum value of the rate of width dimensional change is 700 (ppm) or more.

(7) Storage Stability

Similarly to the above (6), a tape is taken out from a cartridge of the cassette tape produced, and width dimensions (1C, 1D) are measured individually under the following two conditions. The rate of dimensional change is calculated by the following equation. Specifically, the dimensional stability is evaluated according to the following criteria.

After a lapse of 24 hours at 23° C. and 65% RH, a width dimension $1_C$ is measured, and after storing the cartridge in the environment of 40° C. and 20% RH for 10 days, a width dimension $1_D$ is measured after a lapse of 24 hours at 23° C. and 65% RH. A sample cut out from the point at 30 m from the beginning of the tape cartridge, a sample cut out from the point at 100 m, and a sample cut out from the point at 170 m, three in total, were measured. Evaluation C is "unacceptable."

$$\text{Rate of Width Dimensional Change(ppm)} = 10^6 \times (|1_C - 1_D|/1_C)$$

AA: The maximum value of the rate of width dimensional change is less than 50 (ppm)
A: The maximum value of the rate of width dimensional change is not less than 50 (ppm) and less than 100 (ppm)
B: The maximum value of the rate of width dimensional change is not less than 100 (ppm) and less than 150 (ppm)
C: The maximum value of the rate of width dimensional change is 150 (ppm) or more.

(8) Slittability

Similarly to the above (6), a tape is taken out from a cartridge of the cassette tape produced, and the edge thereof was observed. Whiskers generated during the ½ inch slitting were evaluated by the method shown below. The speed of a slitter during the ½ inch slitting was 80 m/min. With regard to the evaluation of the whiskers, the edge face of a film was observed with a scanning electron microscope, and the degree of generation of whiskers was evaluated according to the following criteria. The whisker herein means a film flake detached in the form of fibers.
AA: Almost no whisker generates.
A: Whiskers generate in small amounts.
B: Whiskers generate in large amounts, but slitting can be carried out.
C: Whiskers generate vigorously, and breakage occurs during slitting so frequently that it is difficult to carry out the slitting.

(9) Film Forming Ability

The film forming ability of a film was evaluated according to the following criteria.

AA: There is almost no occurrence of film breakage, and a film can be stably formed.
A: Film breakage occurs occasionally, and film forming stability is slightly low.
B: Film breakage occurs frequently and film forming stability is low, but a film sample could be obtained.
C: A film sample cannot be obtained because film breakage occurs quite frequently, and film forming stability is extremely low.

(10) Crystallite Size, Degree of Crystal Orientation

Wide-angle X-ray diffractometry (transmission method) is performed under the following conditions, and the average value of three measurements is employed as the crystallite size and degree of crystal orientation:
X-ray generator: Model 4036 A2 manufactured by Rigaku Corporation
X-ray source: CuKα radiation (Ni filter)
Output: 40 kV-20 mA
Goniometer: Model 2155 D manufactured by Rigaku Corporation
Slit: 2 mmφ-1°-1°
Detector: Scintillation counter
Attachment: Fiber sample stage manufactured by Rigaku Corporation
Count recorder: Model RAD-C manufactured by Rigaku Corporation
Sample size: 40 mm×1 mm
Sample thickness: Laminated to 1 mm.

Crystallite Size

After measurements were made in the scan mode described below, the crystallite size of polyethylene terephthalate in the molecular chain backbone direction (−105) in the transverse direction (TD direction) of a film was calculated using the calculation equation below:
Scan mode: 2θ–θ step scan
Direction of measurement: Through-TD
Measurement range (2θ): 5 to 60°
Measurement step: 0.05°
Counting time: 5 seconds $$\text{Crystallite size[nm]} = (K \cdot \lambda)/(\beta \cos \theta)$$

$$\beta = (\beta e^2 - \beta o^2)^{0.5}$$

K: Coefficient (transmission method=1.0)
λ: Wavelength (0.15418)
βe: Half-width of diffraction peak
βo: Corrected value of half-width (transmission method=0.6°)

Degree of Crystal Orientation

After measurements were made in the scan mode described below, the degree of crystal orientation of polyethylene terephthalate in the molecular chain backbone direction (−105) in the transverse direction (TD direction) of a film was calculated using the calculation equation below:
Scan mode: β step scan
Diffraction peak: Through (−105) 2θ=about 43°
Measurement range (β): Through (−105) 0 to 360°
Measurement step (β): 0.5°
Counting time: 5 seconds
Degree of crystal orientation=(180−βc)/180
βc: Half-width of β scan.

(11) Rigid Amorphous Volume

The difference between a heat of crystal melting and a heat of cold crystallization (ΔHm−ΔHc) and specific heat difference (ΔCp) were measured under the following conditions; crystallinity (Xc) and mobile amorphous volume (Xma) were calculated; and, further, rigid amorphous volume (Xra) was calculated from the equation below:
Difference between Heat of Crystal Melting and Heat of Cold Crystallization
Method of measurement: Normal DSC
Measuring apparatus: Q1000 manufactured by TA Instruments
Data processing: "Universal Analysis 2000" available from TA Instruments
Atmosphere: Nitrogen stream (50 mL/min)
Temperature/heat calibration: High-purity indium (Tm=156.61° C., ΔHm=28.70 g/J)
Temperature range: 0 to 300° C.
Temperature rise rate: 10° C./min
Sample amount: 10 mg
Sample container: Standard aluminum container
The number of measurements: 2.
Specific Heat Difference
Method of measurement: Temperature-modulated DSC
Measuring apparatus: Q1000 manufactured by TA Instruments
Data processing: "Universal Analysis 2000" available from TA Instruments
Atmosphere: Nitrogen stream (50 mL/min)
Temperature/heat calibration: High-purity indium (Tm=156.61° C., ΔHm=28.70 g/J)
Specific heat calibration: Sapphire
Temperature range: 0 to 200° C.
Temperature rise rate: 2° C./min
Sample amount: 5 mg
Sample container: Standard aluminum container
The number of measurements: 2
Rigid Amorphous Volume $$\text{Crystallinity}(Xc)[\%] = ((\Delta Hm - \Delta Hc)/\text{heat of perfect crystal melting of PET(or PEN)}) \times 100$$

ΔHm: Heat of crystal melting [J/g]
ΔHc: Heat of cold crystallization [J/g]
Heat of perfect crystal melting of PET: 140.10 [J/g]
Heat of perfect crystal melting of PEN: 103.31 [J/g]

$$\text{Mobile amorphous volume}(Xma)[\%] = (\Delta Cp/\text{completely amorphous specific heat difference of PET(or PEN)}) \times 100$$

ΔCp: Specific heat difference before and after Tg
Completely amorphous specific heat difference of PET: 0.4052 J/g° C.
Completely amorphous specific heat difference of PEN: 0.3372 J/g° C.

$$\text{Rigid amorphous volume}(Xra)[\%] = 100 - (Xc + Xma).$$

In this case, when the content of PET is more than 50% by mass in film composition, a heat of perfect crystal melting of PET and a completely amorphous specific heat amount of PET are used and, on the other hand, when the content of PEN is more than 50% by mass in film composition, a heat of perfect crystal melting of PEN and a completely amorphous specific heat amount of PEN are used. When PET and PEN is equivalent in amount (50% by mass), substantially no crystal is formed and, therefore, a heat of crystal melting (ΔHm) cannot be obtained.

(12) Processing Suitability

A film slit to a 1 m width is conveyed at a tension of 200 N, and magnetic paint and non-magnetic paint of the compositions below are applied in layers to one surface (A surface) of a substrate using an extrusion coater (the upper layer is the magnetic paint, coating thickness: 0.2 μm, and the underlayer is the non-magnetic paint, coating thickness: 0.9 μm). The substrate is magnetically oriented and dried at a drying temperature of 100° C. A back coating of the composition below is then applied to the opposite surface (B surface), and then the substrate was calendered using a small test calendering apparatus (steel/nylon roll, five rolls) at a temperature of 85° C. and a line pressure of 2.0×10⁵ N/m and then taken up. From the amount of shrinkage in the transverse direction and the state of coating, processing suitability was evaluated according to the following criteria:

AA: The amount of shrinkage in the transverse direction was less than 5 mm, and a magnetic layer, an underlayer, and a back coating layer were formed without any problem.
A: The amount of shrinkage in the transverse direction was not less than 5 mm and less than 10 mm, and a magnetic layer, an underlayer, and a back coating layer were formed.
B: The amount of shrinkage in the transverse direction was not less than 10 mm and less than 20 mm or wrinkling occurred, and uneven coating was observed at some parts of a magnetic layer, an underlayer, and a back coating layer.
C: The amount of shrinkage in the transverse direction was not less than 20 mm or wrinkling occurred severely, coating of a magnetic layer, an underlayer, and a back coating layer could not be performed.

EXAMPLES

Our films, recording medium and methods will be described by way of the following examples. Polyethylene terephthalate, polyethylene naphthalate, and polyetherimide are herein referred to as PET, PEN, and PEI, respectively.

Reference Example 1

Into a transesterification reactor, 194 parts by mass of dimethyl terephthalate and 124 parts by mass of ethylene glycol were loaded, and the contents were dissolved by heating to 140° C. Thereafter, while stirring the contents, 0.1 parts by mass of magnesium acetate tetrahydrate and 0.05 parts by mass of antimony trioxide were added, and transesterification reaction was carried out while distilling off methanol at 140 to 230° C. Then, a solution of 5 parts by mass of trimethyl phosphate in ethylene glycol was added in an amount of 1 part by mass (0.05 parts by mass in terms of trimethyl phosphate).

When the solution of trimethyl phosphoric acid in ethylene glycol is added, the temperature of the reaction contents decreases. Thus, the stirring was continued until the temperature of the reaction contents returned to 230° C. while distilling off an excess of ethylene glycol. When the temperature of the reaction contents in the transesterification reactor reached 230° C. in this manner, the reaction contents were transferred to a polymerization apparatus.

After the transfer, the temperature of the reaction system was gradually raised from 230° C. to 290° C. and, at the same time, the pressure was reduced to 0.1 kPa. The times until the final temperature and the final pressure were reached were both 60 minutes. After the final temperature and the final pressure were reached, when the reaction was carried out for 2 hours (3 hours from the start of the polymerization), the stirring torque of the polymerization apparatus showed a predetermined value (although the specific value varies depending on the specification of polymerization apparatus, the value polyethylene terephthalate with an intrinsic viscosity of 0.62 shows in this polymerization apparatus was used as a predetermined value). Then, the reaction system was purged with nitrogen and brought back to normal pressure to stop the polycondensation reaction, and the resultant was discharged in strands into cold water and immediately cut to obtain a PET pellet X of polyethylene terephthalate with an intrinsic viscosity of 0.62. (Tm=255° C., Tg=78° C.)

Reference Example 2

To a vented co-rotating twin-screw kneading extruder heated to 280° C., 99 parts by mass of the PET pellet X prepared in Reference Example 1 and 10 parts by mass of a water slurry of 10 parts by mass of colloidal silica particles with an average diameter of 0.06 μm (1 part by mass in terms of colloidal silica particles) were fed, and a vent hole was kept at a vacuum degree of 1 kPa or less to remove water, thereby obtaining a PET pellet $Z_{0.06}$ with an intrinsic viscosity of 0.62 containing 1 part by mass of the colloidal silica particles with an average diameter of 0.06 μm.

Reference Example 3

To a vented co-rotating twin-screw kneading extruder heated to 280° C., 98 parts by mass of the PET pellet X prepared in Reference Example 1 and 20 parts by mass of a water slurry of 10 parts by mass of crosslinked spherical polystyrene particles with an average diameter of 0.3 μm (2 parts by mass in terms of crosslinked spherical polystyrene) were fed, and a vent hole was kept at a vacuum degree of 1 kPa or less to remove water, thereby obtaining a PET pellet $Z_{0.3}$ with an intrinsic viscosity of 0.62 containing 2 parts by mass of the crosslinked spherical polystyrene particles with an average diameter of 0.3 μm.

Reference Example 4

A PET pellet $Z_{0.8}$ with an intrinsic viscosity of 0.62 containing 2 parts by mass of crosslinked spherical polystyrene particles with an average diameter of 0.8 μm was obtained in the same manner as in Reference Example 2 except that the crosslinked spherical polystyrene particles with an average diameter of 0.8 μm were used instead of the crosslinked spherical polystyrene particles with an average diameter of 0.3 μm.

Reference Example 5

To a vented co-rotating twin-screw kneading extruder equipped with three kneading sections with a kneading paddle (manufactured by Japan Steel Works, LTD., screw diameter: 30 mm, screw length/screw diameter=45.5) heated to a temperature of 300° C., 50 parts by mass of the PET pellet X obtained in Reference Example 1 and 50 parts by mass of a pellet of PEI "Ultem 1010" available from SABIC Innovative Plastics were fed, and they were melt extruded at a screw rotation speed of 300 rotation/min, discharged in strands, cooled with water at a temperature of 25° C., and then immediately cut to produce a blend chip (I).

Reference Example 6

To a mixture of 100 parts by mass of dimethyl 2,6-naphthalene dicarboxylic acid and 60 parts by mass of ethylene glycol, 0.03 parts by mass of manganese acetate tetrahydrate was added, and transesterification reaction was carried out while gradually increasing the temperature from a temperature of 150° C. to a temperature of 240° C. During the reaction, when the reaction temperature reached 170° C., 0.024 parts by mass of antimony trioxide was added. Further, when the reaction temperature reached 220° C., 0.042 parts by mass (equivalent to 2 mmol %) of 3,5-dicarboxybenzenesulfonic acid tetrabutylphosphonium salt was added. Thereafter, the transesterification reaction was continuously carried out, and 0.023 parts by mass trimethyl phosphoric acid was added. Then, the reaction product was transferred to the polymerization apparatus. The temperature was raised to a temperature of 290° C., and polycondensation reaction was carried out under a highly reduced pressure of 30 Pa. The stirring torque of the polymerizetion apparatus showed a predetermined value (although the specific value varies depending on the specification of polymerization apparatus, the value polyethylene-2,6-naphthalate with an intrinsic viscosity of 0.65 shows in this polymerization apparatus was used as a predetermined value). Then, the reaction system was purged with nitrogen and brought back to normal pressure to stop the polycondensation reaction, and the resultant was discharged in strands into cold water and immediately cut to obtain a PEN pellet X' with an intrinsic viscosity of 0.65.

Reference Example 7

To a vented co-rotating twin-screw kneading extruder heated to 280° C., 99 parts by mass of the PEN pellet X' prepared in Reference Example 6 and 10 parts by mass of a water slurry of 10 parts by mass of colloidal silica particles with an average diameter of 0.06 μm (1 part by mass in terms of colloidal silica particles) were fed, and a vent hole was kept at a vacuum degree of 1 kPa or less to remove water, thereby obtaining a PEN pellet $Z'_{0.06}$ with an intrinsic viscosity of 0.65 containing 1 part by mass of the colloidal silica particles with an average diameter of 0.06 μm.

Reference Example 8

To a vented co-rotating twin-screw kneading extruder heated to 280° C., 98 parts by mass of the PEN pellet X' prepared in Reference Example 6 and 20 parts by mass of a water slurry of 10 parts by mass of crosslinked spherical polystyrene particles with an average diameter of 0.3 μm (2 parts by mass in terms of crosslinked spherical polystyrene) were fed, and a vent hole was kept at a vacuum degree of 1 kPa or less to remove water, thereby obtaining a PEN pellet $Z'_{0.3}$ with an intrinsic viscosity of 0.65 containing 2 parts by mass of the crosslinked spherical polystyrene particles with an average diameter of 0.3 μm.

Reference Example 9

A PEN pellet $Z'_{0.8}$ with an intrinsic viscosity of 0.65 containing 2 parts by mass of crosslinked spherical polystyrene particles with an average diameter of 0.8 μm was obtained in the same manner as in Reference Example 8 except that the crosslinked spherical polystyrene particles with an average diameter of 0.8 μm were used instead of the crosslinked spherical polystyrene particles with an average diameter of 0.3 μm.

Example 1

Two extruders E and F were used. Eighty parts by mass of the PET pellet X and 20 parts by mass of the PET pellet $Z_{0.06}$ obtained in Reference Examples 1 and 2 were individually dried under reduced pressure at 180° C. for 3 hours, and then fed to the extruder E heated to 280° C. Eighty-four parts by mass of the PET pellet X, 15 parts by mass of the PET pellet $Z_{0.3}$, and 1 part by mass of the PET pellet $Z_{0.8}$ obtained in Reference Examples 1, 3, and 4 were individually dried under reduced pressure at 180° C. for 3 hours, and then fed to the extruder F heated to 280° C. The resultants were joined in a T-die to form a two-layer lamination (layer ratio: extruder E (A surface side)/extruder F (B surface side)=7/1) and solidified by contact cooling such that the B surface side is in contact with a casting drum with a surface temperature of 25° C. while applying an electrostatic charge to the casting drum to produce a layered unstretched film.

Then, the layered unstretched film obtained was preheated with a group of heated rollers, stretched 3.3-fold (MD stretching) at a temperature of 90° C., and then cooled with a group of rollers at a temperature of 25° C. to obtain a uniaxially stretched film. The uniaxially stretched film obtained was conducted to a preheating zone at a temperature of 85° C. in a tenter with both ends held by clips and then continuously subjected to a 3.7-fold stretching in the transverse direction (TD direction) perpendicular to the machine direction in a heating zone at a temperature of 105° C. (TD stretching 1), followed by a 1.3-fold stretching in the transverse direction in a heating zone at a temperature of 180° C. (TD stretching 2). The stretched film was continuously subjected to a heat treatment at a temperature of 180° C. for 5 seconds in a heat treatment zone in the tenter and, further, 1% relaxation treatment was carried out in the transverse direction at a temperature of 180° C. Then, after being cooled to 25° C. uniformly, film edges were removed, and the film was taken up on a core to obtain a biaxial stretched polyester film with a thickness of 5 μm.

The evaluation of the biaxially oriented polyester film obtained showed that, as shown in the Tables, it had excellent dimensional stability, storage stability, slittability, and film forming ability.

Example 2

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor storage stability and slittability because the Young's modulus in the MD direction was low, but had excellent dimensional stability and film forming ability, as shown in the Tables.

Example 3

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor film forming ability because the Young's modulus in the MD direction was high, but had excellent dimensional stability, storage stability, and slittability, as shown in the Tables.

Example 4

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor dimensional stability because the Young's modulus in the TD direction was low, but had excellent storage stability, slittability, and film forming ability, as shown in the Tables.

Example 5

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor slittability and film forming ability because the Young's modulus in the TD direction was high, but had excellent dimensional stability and storage stability, as shown in the Tables.

Example 6

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor storage stability and slittability because the crystallinity was low, but had excellent dimensional stability and film forming ability, as shown in the Tables.

Example 7

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor dimensional stability because the crystallinity was high, but had excellent storage stability, slittability, and film forming ability, as shown in the Tables.

Example 8

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor film forming ability because the average refractive index n_bar was low, but had excellent dimensional stability, storage stability, and slittability, as shown in the Tables.

Example 9

A biaxially oriented polyester film was obtained in the same manner as in Example 1 except that the film-forming conditions were changed as shown in the Tables. The evaluation of the biaxially oriented polyester film obtained showed that it had, when used as a magnetic tape, slightly poor dimensional stability because the average refractive index n_bar was high, but had excellent storage stability, slittability, and film forming ability, as shown in the Tables.

Example 10

Two extruders E and F were used. To the extruder E heated to 295° C., 70 parts by mass of the PET pellet X, 20 parts by mass of the PET pellet $Z_{0.06}$, and 10 parts by mass of the blend chip (I) obtained in Reference Examples 1, 2, and 5 were fed after being dried under reduced pressure at 180° C. for 3 hours, and to the extruder F heated also to 295° C., 74 parts by mass of the PET pellet X, 15 parts by mass of the PET pellet $Z_{0.3}$, 1 part by mass of the PET pellet $Z_{0.8}$, and 10 parts by mass of the blend chip (I) obtained in Reference Examples 1, 3, 4, and 5 were fed after being dried under reduced pressure at 180° C. for 3 hours. A biaxially oriented polyester film was obtained in the same manner as in Example 1 except that the resultants were joined in a T-die to form a two-layer lamination (layer ratio: E (A surface side)/F (B surface side)=7/1)

and solidified by contact cooling while applying an electrostatic charge to a casting drum with a surface temperature of 25° C. to produce a layered unstretched film and that the film-forming conditions were changed as shown in Table 1.

The evaluation of the biaxially oriented polyester film obtained showed that it had excellent dimensional stability, storage stability, slittability, and film forming ability, as shown in the Tables.

Example 11

A biaxially oriented polyester film was obtained in the same manner as in Example 1 except that a layered unstretched film was produced using the PEN pellet X', the PEN pellet $Z'_{0.06}$, the PEN pellet $Z'_{0.3}$, and the PEN pellet $Z'_{0.8}$ obtained in Reference Examples 6, 7, 8, and 9 instead of the PET pellet X, the PET pellet $Z_{0.06}$, the PET pellet $Z_{0.3}$, and the PET pellet $Z_{0.8}$ used in Example 1 and that the film-forming conditions were changed as shown in Table 1.

The evaluation of the biaxially oriented polyester film obtained showed that it had slightly excellent dimensional stability, storage stability, slittability, and film forming ability, as shown in the Tables.

Example 12

A biaxially oriented polyester film was obtained in the same manner as in Example 1 except that the film-forming conditions were changed as shown in the Tables. The biaxially oriented polyester film obtained had a large crystallite size in the molecular chain backbone direction in the transverse direction, a high degree of crystal orientation, and a large rigid amorphous volume because the preheating temperature of the TD stretching 1 (95° C.) was set at higher than the cold crystallization temperature of a film after MD stretching (92° C.), and had, when used as a magnetic tape, excellent dimensional stability, storage stability, slittability, film forming ability, and processing suitability, as shown in the Tables.

Example 13

A biaxially oriented polyester film was obtained in the same manner as in Example 1 except that the film-forming conditions were changed as shown in the Tables. The biaxially oriented polyester film obtained had a large crystallite size in the molecular chain backbone direction in the transverse direction, a high degree of crystal orientation, and a large rigid amorphous volume because the preheating temperature of the TD stretching 1 was set at higher than the cold crystallization temperature of a film after MD stretching, and had, when used as a magnetic tape, excellent dimensional stability, storage stability, slittability, film forming ability, and processing suitability, as shown in the Tables.

Example 14

A biaxially oriented polyester film was obtained in the same manner as in Example 1 except that the film-forming conditions were changed as shown in the Tables. The biaxially oriented polyester film obtained had slightly poor film forming ability because the preheating temperature of the TD stretching 1 was set at excessively higher than the cold crystallization temperature of a film after MD stretching but had a large crystallite size in the molecular chain backbone direction in the transverse direction, a high degree of crystal orientation, and a large rigid amorphous volume, and had, when used as a magnetic tape, excellent dimensional stability, storage stability, slittability, and processing suitability, as shown in the Tables.

Example 15

A biaxially oriented polyester film was obtained in the same manner as in Example 1 except that the film-forming conditions were changed as shown in the Tables. The biaxially oriented polyester film obtained had a slightly small effect of growing a crystallite size in the molecular chain backbone direction in the transverse direction because the preheating temperature of the TD stretching 1 was slightly lower than the cold crystallization temperature of a film after MD stretching, and had, when used as a magnetic tape, slightly poor processing suitability, but had excellent dimensional stability, storage stability, slittability, and film forming ability, as shown in the Tables.

Example 16

A biaxially oriented polyester film was obtained in the same manner as in Example 11 except that the film-forming conditions were changed as shown in the Tables. Since polyethylene naphthalate provides a film after MD stretching with high crystallinity, even if the preheating temperature of the TD stretching 1 was set at higher than the cold crystallization temperature of a film after MD stretching, film forming ability deteriorated, and progress of crystallization and orientation relaxation occurred, and the biaxially oriented polyester film obtained had, when used as a magnetic tape, slightly excellent processing suitability, but had slightly poor dimensional stability, storage stability, slittability, and film forming ability, as shown in the Tables.

Example 17

A biaxially oriented polyester film was obtained in the same manner as in Example 1 except that the stretching was performed under the film-forming conditions shown in the Tables. The biaxially oriented polyester film obtained had slightly poor dimensional stability because the heat-setting temperature was higher than the TD stretching 2 temperature and the average refractive index n_bar was outside our most preferred range.

Comparative Example 1

A biaxially oriented polyester film was obtained in the same manner as in Example 1 except that the stretching was performed under the film-forming conditions shown in the Tables. Because the ratio of TD Young's modulus to MD Young's modulus was small, film forming ability deteriorated, and the biaxially oriented polyester film obtained had very poor dimensional stability.

Comparative Example 2

A biaxially oriented polyester film was obtained in the same manner as in Example 1 except that the stretching was performed under the film-forming conditions shown in the Tables. Because the ratio of TD Young's modulus to MD Young's modulus was large, the coefficient of hygroscopic expansion was large and film forming ability deteriorated, and the biaxially oriented polyester film obtained had very poor storage stability and slittability.

Comparative Example 3

A biaxially oriented polyester film was obtained in the same manner as in Example 1 except that the stretching was performed under the film-forming conditions shown in the Tables. Because the ratio of the TD stretching 1 ratio to the TD stretching 2 ratio (TD stretching 1 ratio/TD stretching 2 ratio) was small, the coefficient of hygroscopic expansion was large and film forming ability deteriorated, and the biaxially oriented polyester film obtained had very poor dimensional stability.

Comparative Example 4

A biaxially oriented polyester film was obtained in the same manner as in Example 1 except that the stretching was performed under the film-forming conditions shown in the Tables. Because the heat-setting temperature was lower than the TD stretching 2 temperature and the average refractive index n_bar was outside our range, the biaxially oriented polyester film obtained had poor dimensional stability and slittability.

Comparative Example 5

A biaxially oriented polyester film was obtained in the same manner as in Example 1 except that the stretching was performed under the film-forming conditions shown in the Tables. Because the heat-setting temperature was lower than the TD stretching 2 temperature and the minor melting peak temperature T-meta was outside our range, the biaxially oriented polyester film obtained had very poor dimensional stability, storage stability, and slittability.

Comparative Example 6

A biaxially oriented polyester film was obtained in the same manner as in Example 1 except that the stretching was performed under the film-forming conditions shown in the Tables. Because the heat-setting temperature was higher than the TD stretching 2 temperature and the minor melting peak temperature T-meta was outside our range, the biaxially oriented polyester film obtained had very poor dimensional stability.

TABLE 1

| | | Film-Forming Conditions | | |
|---|---|---|---|---|
| | | MD Stretching | | Cold Crystallization |
| | Polyester | Temperature [° C.] | Ratio [Fold] | Temperature of Film After MD Stretching [° C.] |
| Example 1 | PET | 90 | 3.3 | 92 |
| Example 2 | PET | 90 | 3.0 | 92 |
| Example 3 | PET | 90 | 4.0 | 92 |
| Example 4 | PET | 90 | 3.3 | 92 |
| Example 5 | PET | 90 | 3.3 | 92 |
| Example 6 | PET | 90 | 3.3 | 92 |
| Example 7 | PET | 90 | 3.3 | 92 |
| Example 8 | PET | 90 | 3.3 | 92 |
| Example 9 | PET | 90 | 3.3 | 92 |
| Example 10 | PET/PEI | 95 | 3.3 | 95 |
| Example 11 | PEN | 115 | 3.8 | 92 |
| Example 12 | PET | 90 | 3.3 | 92 |
| Example 13 | PET | 90 | 3.3 | 92 |
| Example 14 | PET | 90 | 3.3 | 92 |
| Example 15 | PET | 90 | 3.3 | 92 |
| Example 16 | PEN | 115 | 3.8 | 140 |
| Example 17 | PET | 90 | 3.3 | 92 |
| Comparative Example 1 | PET | 90 | 3.8 | 92 |
| Comparative Example 2 | PET | 90 | 3.0 | 92 |
| Comparative Example 3 | PET | 90 | 3.5 | 92 |
| Comparative Example 4 | PET | 90 | 3.3 | 92 |
| Comparative Example 5 | PET | 90 | 3.3 | 92 |
| Comparative Example 6 | PET | 90 | 3.3 | 92 |

TABLE 2

| | Film-Forming Conditions | | | | | | | |
|---|---|---|---|---|---|---|---|---|
| | TD Stretching 1 (TD1) | | | TD Stretching 2 (TD2) | | Heat-setting | Ratio of | |
| | Preheating Temperature [° C.] | Temperature [° C.] | Ratio [Fold] | Temperature [° C.] | Ratio [Fold] | Temperature [° C.] | Stretching Ratios TD1/TD2 | Ratio of Stretching Ratios TD1*TD2/MD |
| Example 1 | 85 | 105 | 3.7 | 180 | 1.3 | 180 | 2.85 | 1.46 |
| Example 2 | 85 | 105 | 3.7 | 180 | 1.3 | 180 | 2.85 | 1.60 |
| Example 3 | 85 | 105 | 3.7 | 180 | 1.3 | 180 | 2.85 | 1.20 |
| Example 4 | 85 | 105 | 3.7 | 180 | 1.2 | 180 | 3.08 | 1.35 |
| Example 5 | 85 | 105 | 4.0 | 180 | 1.6 | 180 | 2.50 | 1.94 |
| Example 6 | 85 | 105 | 3.7 | 170 | 1.3 | 165 | 2.85 | 1.46 |
| Example 7 | 85 | 105 | 3.7 | 190 | 1.3 | 195 | 2.85 | 1.46 |
| Example 8 | 85 | 105 | 4.5 | 180 | 1.1 | 180 | 4.09 | 1.50 |
| Example 9 | 85 | 105 | 3.0 | 180 | 1.6 | 180 | 1.88 | 1.45 |
| Example 10 | 85 | 110 | 3.7 | 180 | 1.3 | 180 | 2.85 | 1.46 |
| Example 11 | 85 | 120 | 4.0 | 190 | 1.4 | 190 | 2.86 | 1.47 |
| Example 12 | 95 | 105 | 3.7 | 180 | 1.3 | 180 | 2.85 | 1.46 |
| Example 13 | 95 | 105 | 3.7 | 190 | 1.3 | 190 | 2.85 | 1.46 |
| Example 14 | 100 | 105 | 3.7 | 180 | 1.3 | 180 | 2.85 | 1.46 |
| Example 15 | 90 | 105 | 3.7 | 180 | 1.3 | 180 | 2.85 | 1.46 |
| Example 16 | 145 | 120 | 4.0 | 190 | 1.4 | 190 | 2.86 | 1.47 |
| Example 17 | 85 | 105 | 4.5 | 180 | 1.05 | 190 | 4.29 | 1.43 |

TABLE 2-continued

| | Film-Forming Conditions | | | | | | | |
|---|---|---|---|---|---|---|---|---|
| | TD Stretching 1 (TD1) | | | TD Stretching 2(TD2) | | Heat-setting | Ratio of | |
| | Preheating Temperature [° C.] | Temperature [° C.] | Ratio [Fold] | Temperature [° C.] | Ratio [Fold] | Temperature [° C.] | Stretching Ratios TD1/TD2 | Ratio of Stretching Ratios TD1*TD2/MD |
| Comparative Example 1 | 85 | 105 | 3.7 | 180 | 1.2 | 180 | 3.08 | 1.17 |
| Comparative Example 2 | 85 | 105 | 4.3 | 180 | 1.4 | 180 | 3.07 | 2.01 |
| Comparative Example 3 | 85 | 105 | 3.0 | 180 | 1.7 | 180 | 1.76 | 1.46 |
| Comparative Example 4 | 85 | 105 | 4.0 | 180 | 1.05 | 170 | 3.81 | 1.27 |
| Comparative Example 5 | 85 | 105 | 3.7 | 180 | 1.3 | 160 | 2.85 | 1.46 |
| Comparative Example 6 | 85 | 105 | 3.7 | 180 | 1.3 | 195 | 2.85 | 1.46 |

TABLE 3

| | Film Physical Properties | | | | | | |
|---|---|---|---|---|---|---|---|
| | Young's Modulus | | | Coefficient of Hygroscopic Expansion [ppm/% RH] TD | Average Refractive Index n_bar | Birefringence $\Delta n \times 10^{-3}$ | |
| | [GPa] | | ETD/EMD Ratio | | | | |
| | EMD | ETD | | | | | |
| Example 1 | 4.3 | 8.0 | 1.9 | 4.5 | 1.602 | −40 | |
| Example 2 | 3.0 | 8.0 | 2.7 | 4.5 | 1.602 | −60 | |
| Example 3 | 4.5 | 8.0 | 1.8 | 4.5 | 1.602 | −30 | |
| Example 4 | 4.3 | 6.5 | 1.5 | 6.0 | 1.602 | −20 | |
| Example 5 | 4.3 | 12 | 2.8 | 3.0 | 1.602 | −60 | |
| Example 6 | 4.3 | 8.0 | 1.9 | 4.0 | 1.590 | −40 | |
| Example 7 | 4.3 | 8.0 | 1.9 | 5.5 | 1.615 | −40 | |
| Example 8 | 4.3 | 8.0 | 1.9 | 4.0 | 1.590 | −40 | |
| Example 9 | 4.3 | 8.0 | 1.9 | 5.5 | 1.615 | −40 | |
| Example 10 | 4.3 | 7.9 | 1.8 | 4.7 | 1.605 | −40 | |
| Example 11 | 5.0 | 10 | 2.0 | 5.0 | 1.615 | −40 | |
| Example 12 | 4.3 | 8.5 | 2.0 | 4.1 | 1.602 | −45 | |
| Example 13 | 4.3 | 8.5 | 2.0 | 4.5 | 1.615 | −45 | |
| Example 14 | 4.3 | 9.0 | 2.1 | 3.8 | 1.602 | −50 | |
| Example 15 | 4.3 | 8.0 | 1.9 | 4.4 | 1.602 | −41 | |
| Example 16 | 5.0 | 10.5 | 2.1 | 5.9 | 1.675 | −45 | |
| Example 17 | 4.3 | 8.0 | 1.9 | 6.0 | 1.617 | −40 | |
| Comparative Example 1 | 4.4 | 6.3 | 1.4 | 6.1 | 1.613 | −15 | |
| Comparative Example 2 | 3.0 | 9.2 | 3.1 | 4.2 | 1.602 | −65 | |
| Comparative Example 3 | 4.3 | 7.0 | 1.6 | 6.2 | 1.602 | −40 | |
| Comparative Example 4 | 4.3 | 7.5 | 1.7 | 6.0 | 1.588 | −40 | |
| Comparative Example 5 | 4.3 | 8.0 | 1.9 | 6.5 | 1.605 | −40 | |
| Comparative Example 6 | 4.3 | 8.0 | 1.9 | 7.0 | 1.625 | −40 | |

TABLE 4

| | Film Physical Properties | | | | |
|---|---|---|---|---|---|
| | Minor Melting Peak Temperature T-meta [° C.] | Heat of Crystal Melting ΔHm [J/g] | Crystallite Size TD [nm] | Degree of Crystal Orientation TD | Rigid Amorphous Xra [%] |
| Example 1 | 180 | 38 | 5.2 | 0.77 | 44 |
| Example 2 | 180 | 38 | 5.2 | 0.77 | 44 |
| Example 3 | 180 | 38 | 5.2 | 0.77 | 44 |
| Example 4 | 180 | 38 | 5.2 | 0.67 | 44 |
| Example 5 | 180 | 38 | 5.2 | 0.87 | 44 |
| Example 6 | 165 | 32 | 5.4 | 0.79 | 38 |
| Example 7 | 190 | 45 | 5.1 | 0.71 | 47 |
| Example 8 | 180 | 35 | 5.2 | 0.79 | 44 |
| Example 9 | 180 | 42 | 5.2 | 0.71 | 44 |
| Example 10 | 180 | 35 | 5.2 | 0.76 | 44 |
| Example 11 | 190 | 30 | — | — | 46 |
| Example 12 | 180 | 38 | 7.0 | 0.80 | 45 |
| Example 13 | 190 | 45 | 6.5 | 0.77 | 46 |
| Example 14 | 180 | 38 | 7.5 | 0.81 | 45 |
| Example 15 | 180 | 38 | 5.4 | 0.78 | 44 |
| Example 16 | 190 | 30 | — | — | 47 |
| Example 17 | 190 | 45 | 5.0 | 0.67 | 46 |
| Comparative Example 1 | 180 | 40 | 5.2 | 0.67 | 44 |
| Comparative Example 2 | 180 | 38 | 5.2 | 0.79 | 44 |
| Comparative Example 3 | 180 | 38 | 5.2 | 0.66 | 44 |
| Comparative Example 4 | 170 | 35 | 5.9 | 0.67 | 41 |
| Comparative Example 5 | 159 | 29 | 6.1 | 0.64 | 38 |
| Comparative Example 6 | 192 | 50 | 4.9 | 0.61 | 51 |

TABLE 5

| | Evaluation | | | | |
|---|---|---|---|---|---|
| | Dimensional Stability | Storage Stability | Processing Suitability | Slittability | Film Forming Ability |
| Example 1 | AA | AA | A | AA | AA |
| Example 2 | AA | A | A | A | AA |
| Example 3 | AA | AA | A | AA | A |
| Example 4 | B | A | A | AA | AA |
| Example 5 | AAA | AA | B | A | A |
| Example 6 | AA | B | B | B | AA |
| Example 7 | A | AA | A | AA | AA |
| Example 8 | AA | AA | A | A | A |
| Example 9 | A | AA | A | AA | A |
| Example 10 | AA | AA | A | A | AA |
| Example 11 | A | A | AA | A | AA |
| Example 12 | AAA | AA | AA | AA | AA |
| Example 13 | AA | AA | AA | AA | AA |
| Example 14 | AAA | AA | AA | AA | A |
| Example 15 | AA | AA | A | AA | AA |
| Example 16 | B | A | AA | B | A |
| Example 17 | B | AA | A | AA | B |
| Comparative Example 1 | C | A | A | AA | B |
| Comparative Example 2 | A | C | A | C | B |
| Comparative Example 3 | C | A | A | AA | B |
| Comparative Example 4 | B | B | B | C | AA |
| Comparative Example 5 | C | C | C | C | AA |
| Comparative Example 6 | C | AA | A | AA | AA |

The invention claimed is:

1. A biaxially oriented polyester film having
a ratio of Young's modulus in a transverse direction ETD to Young's modulus in a machine direction EMD, ETD/EMD, of 1.5 to 3,
an n_bar, which represents an average of a refractive index in a machine direction nMD, a refractive index in a transverse direction nTD, and a refractive index in a thickness direction nZD ((nMD+nTD+nZD)/3), of 1.590 to 1.680,
a minor melting peak temperature T-meta of 160 to 190° C., and
a coefficient of hygroscopic expansion in the transverse direction of 0 to 6 ppm/% RH, and
a heat of crystal melting ΔHm of 32 to 45 J/g,
a degree of crystal orientation in the crystal backbone direction by wide-angle x-ray in the transverse direction of 0.75 to 0.90.

2. The biaxially oriented polyester film according to claim 1, wherein the polyester is mainly composed of polyethylene terephthalate.

3. The biaxially oriented polyester film according to claim 2, having a crystallite size in a crystal backbone direction by wide-angle x-ray in the transverse direction of 5.5 to 8.0 nm.

4. The biaxially oriented polyester film according to claim 1, having a rigid amorphous volume calculated by temperature-modulated DSC of 38 to 50%.

5. The biaxially oriented polyester film according to claim 4, wherein the polyester is mainly composed of polyethylene terephthalate.

6. The biaxially oriented polyester film according to claim 1, having a Young's modulus in the machine direction of 3.0 to 4.4 GPa.

7. The biaxially oriented polyester film according to claim 6, wherein the polyester is mainly composed of polyethylene terephthalate.

8. The biaxially oriented polyester film according to claim 6, having a rigid amorphous volume calculated by temperature-modulated DSC of 38 to 50%.

9. The biaxially oriented polyester film according to claim 1, having a birefringence Δn, which represents a difference between the refractive index in the machine direction nMD and the refractive index in the transverse direction nTD (nMD−nTD), of −0.060 to −0.020.

10. The biaxially oriented polyester film according to claim 9, wherein the polyester is mainly composed of polyethylene terephthalate.

11. The biaxially oriented polyester film according to claim 9, having a Young's modulus in the machine direction of 3.0 to 4.4 GPa.

12. The biaxially oriented polyester film according to claim 9, having a rigid amorphous volume calculated by temperature-modulated DSC of 38 to 50%.

13. A linear magnetic recording medium using the biaxially oriented polyester film according to claim 1.

* * * * *